April 4, 1967  R. W. REICH  3,312,883
DRIVING MECHANISM OF A TORSIONAL OSCILLATOR
Filed April 2, 1964

Inventor
ROBERT WALTER REICH

By Toulmin & Toulmin
Attorneys ized circuit to utilize the voltage created in the exciter coil for the purpose of energizing the driving coil.

United States Patent Office 3,312,883
Patented Apr. 4, 1967

3,312,883
DRIVING MECHANISM OF A TORSIONAL OSCILLATOR
Robert Walter Reich, Merzhauserstr. 143, Freiburg im Breisgau, Germany
Filed Apr. 2, 1964, Ser. No. 356,888
Claims priority, application Germany, Apr. 4, 1963, R 34,864
6 Claims. (Cl. 318—132)

This invention relates to the driving mechanism of a torsional oscillator which is driven electrically without the use of electrical contacts.

Prior circuit arrangements for electrically maintaining torsional oscillations without the use of electrical contacts do exist; however, applicant knows of none which uses the construction as set forth in this application.

The prior arrangements generally include a torsional oscillator such as a balance wheel in an electrical clock. In this arrangement there are usually magnetic poles which act upon the member undergoing the torsional oscillation or upon a member which is periodically moved by the torsional oscillator. An exciter coil is generally used in connection with a transistorized circuit to initiate a flux of current through a second coil which acts as the driving element for the torsional oscillator.

In prior constructions of this variety, the coil and magnetic systems are constructed so that the driving impulse is generated only during a small portion of the oscillation period. In an oscillator such as the balance wheel of a clock, it follows then that the area occupied by the magnetic poles corresponds to only a small portion of the full oscillation arc.

A construction of watches according to the above principle would require small magnets or magnetic poles. As the magnets or poles do not take up much space, the coils too must be made according to tiny dimensions. If a bifilar (noninductive) winding of the exciter and driving coils is used, then the oscillations which arise due to the feedback across the transistor circuit are very hard to suppress. Damping then has to be selected in a manner that no transistor-oscillator is created which oscillates continuously; otherwise, the clock would not run.

Such setups with small magnetic poles and correspondingly tiny coils use large amounts of current, thus the duration of operations must be cut down.

There are other disadvantages inherent in the prior art constructions. Since the driven balance-wheel oscillator runs in direct proportion to the applied voltage, the oscillator becomes unnecessarily sensitive to voltage changes.

Also, the temperature behavior of such an oscillator is unfavorable. In circuits of the variety used above, it is necessary that transistors having high amplification factors be employed, but the temperature characteristics of transistors having a high amplification factor are poor. At temperatures below 0° C. clocks or watches which contain such transistors simply stand still and do not run.

The manufacture of the tiny coils used in the prior art clock constructions are expensive since they are generally produced as baked coils, and when bifilar windings are employed, the scrap associated with this production is expensively excessive.

A further disadvantage of prior art constructions is that the magnetic poles have to be placed unilaterally with respect to the axis of rotation. This necessitates counter balancing the magnets with weights upon the balance wheel oscillator which means more mass must be accelerated with the accompanying loss of efficiency. In those applications in which a magnetic pole is placed on the periphery of a disc to oscillate in front of a coil, the weight of the disc or balance wheel is still increased essentially and off center mass concentration affects the isochronism adversely. In each of the above cases, a large mass must be moved whereas only a small magnetic pole is available for the excitation and for the transmitting of the driving impulse.

The present invention relates to the driving mechanism of a torsional oscillator which is driven electrically without the use of electrical contacts. The mechanism includes an oscillator coil and a driving coil in conjunction with magnetic poles which are positioned on the oscillating member of the mechanism. The magnetic poles are of a size which corresponds to the oscillation amplitude or arc. For example, if the oscillating member travels through an arc of 270°, then the magnetic poles used would also be constructed to occupy an angle of 270°. Also associated with the mechanism is a transistor- The object of the present invention is to provide an improved construction for oscillators which are electrically driven without the use of electrical contacts.

A further object of this invention is to provide an improved oscillator having magnetic poles which correspond to at least the full oscillation arc of the oscillator.

These and other objects of this invention will become apparent from the following detailed description taken in connection with the accompanying drawings wherein.

Figure 1:
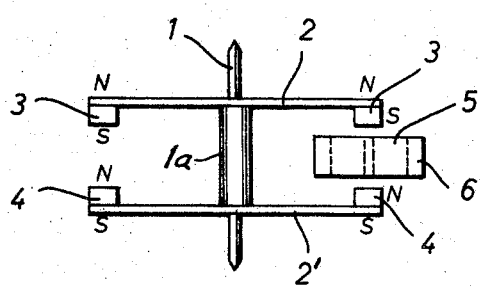
FIGURE 1 is a side view of a first embodiment of this invention.

Referring to the drawings in more detail, FIGURE 1 shows a side view of a first embodiment of this invention. It includes an axle 1 on to which an upper disc 2 and lower disc 2' are securely fastened to rotate therewith to form the oscillating member.

An annular or arcuately shaped magnet 3 is secured to the underside of the disc 2 and an annular magnet 4 of opposite polarity is secured to the upper side of lower disc 2' as shown.

If the oscillating member is to rotate through an angle of 270°, the angular magnets 3 and 4 are so constructed that they will occupy at least a full arc of 270°. While 270° was chosen in this embodiment, it is understood that other angles could be employed. The essential point is that the magnetic poles have a size which is at least equal to or greater than the intended full oscillation arc.

The magnets 3 and 4 are magnetized axially and they are placed on the discs so that opposite poles face each other. The magnetic pole on the upper disc 2 has a south pole across the full oscillation arc of 270° while correspondingly, the lower disc has a North Pole across the same arc. A portion of the axis 1a can be used to create a return path and thereby increase the magnetization.

The upper and lower discs 2 and 2' have a portion cut out between which cut out portions 7, the coil arrangement 5 and 6 are positioned. The coil arrangement is of known construction with the driving coil 5 being concentric with the exciter coil 6 and mounted thereinside.

Figure 2:
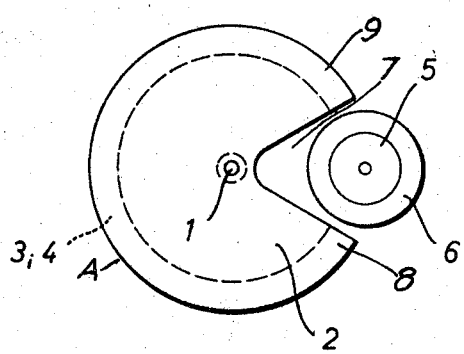
FIGURE 2 is a plan view of FIGURE 1.
Figure 4:
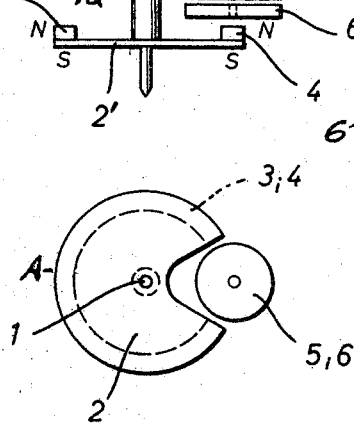
FIGURE 4 is a plan view of FIGURE 3.

Known means (not shown) are used to bias the oscillating member to the zero or null position in which it is shown in FIGURES 2 and 4.

Such a known biasing means could, for example, consist of a hair spring connected between shaft 1 and a stationary point as in connection with a conventional clockwork balance wheel.

The null position of the oscillating member could be located elsewhere about the periphery thereof.

In the operation of the device, assume the oscillating member shown in FIGURE 2 has been travelling in a clockwise direction and the trailing edge 8 has just past over the coil combination. In passing over the coil combination, there is an abrupt change in the flux in the exciter coil 6 which is brought about by the cut out portion 7 of the oscillating member passing thereover. This abrupt change in flux causes a driving current to be sent through driver coil 5 which produces a North Pole at the top of the coil 5 and a South Pole at the bottom which produces a driving attraction for the trailing edge 8. The driving impulse thus created rotates the oscillating member in a counterclockwise direction and the trailing edge 8 then passes over the coil combination.

The oscillator member continue to move in a counterclockwise direction until the trailing edeg 9 passes over the coil combination. Since the cut out portion 7 now passes over the coil combination, there is a change in the flux through the combination and a current is induced in the exciter coil 6 which causes a driving current to be sent through the driving coil 6 as previously explained. The trailing edge 9 is attracted to the coil 6 and receives its driving impulse to send edge 9 in a clockwise direction. This brings trailing edge 8 over the coil combination again to repeat the process.

It should be noted that the magnets 3 and 4 are magnetized axially and across the full oscillation arc which in the previous example was 270°. Since the magnetic poles are very strong due to great magnetic mass and the large pole area, the change of flux is well defined and the absolute value thereof is very great.

The value of the change of flux in the arrangement of this invention is several times greater than the flux of prior art construction which employ small magnetic poles.

The large magnetic mass of this invention (which correspond to extended magnetic poles) produce an additional benefit in that the oscillation amplitude is maintained irrespective of the voltage. A dependency upon the operating voltage of the battery exists therefore within rather narrow limits. For example, the driving mechanism of this invention will keep on running until the battery voltage has dropped down to about 0.6 volt, with no significant changes of the oscillation amplitude. This is to be contrasted with clocks employing driving mechanisms having a small magnetic pole in which rather small changes of voltage lead to an inaccuracy of running.

Another advantage of the present invention is that the temperature operating characteristics of the driving mechanism are greatly improved prior art constructions. Because of the greater inductive magnetic forces which are available, the impulse generated in the exciter coil is stabilized and strong and will open the transistor even at lower operating temperatures. Since the change of flux brought about by the trailing edges passing over the coil combination is sharp and occurs automatically and all of a sudden, and not sinusiodally as in the case of a small magnetic pole, the driving impulse is very strong and of short duration which is very valuable in isochronous driving mechanisms.

Figure 3:
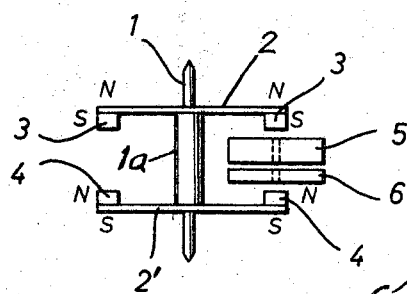
FIGURE 3 is a side view of a modification showing a different arrangement for the exciter and driving coils.

FIGURES 3 and 4 show a second modification of this invention in which the coil combination is arranged somewhat differently in that the driving coil 5 is positioned above the exciter coil 6. The operation of this modification is similar to that previously explained.

Figure 5:
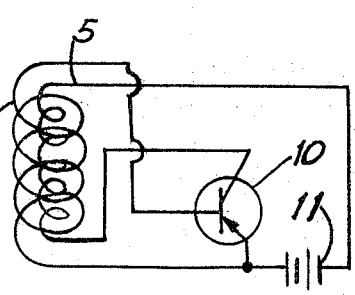
FIGURE 5 is a circuit used in this invention.

FIGURE 5 shows the circuit diagram used in this invention. It consists of standard transistor 10 which has the exciter coil 6 connected between the base and emitter. One side of the driving coil 5 is connected to the collector and the other side is in series with battery 11 which is connected to the emitter as shown.

The use of large magnetic poles which have a size corresponding to the full oscillation arc of the oscillating members brings about rather simple watch constructions whose performance does not depend upon the accurate positioning of small magnetic poles.

The exciting and driving impulses of this invention are brought about by a flux change with a steep slope which flux is induced by a very strong magnetic field. The high value of the flux change is sufficient to be used with transistors having a low amplification factor so that the driving mechanism will not be affected by low temperature. In fact, transistors having an amplification factor of about 20 can be satisfactorily used. The induction voltage created and the generated induction current will open even such transistors which opening could not be accomplished by driving mechanisms having small magnetic poles.

It will be understood that this invention is susceptible to modification in order to adapt it to different usages and conditions and, accordingly, it is desired to comprehend such modifications within this invention as may fall within the scope of the appended claims.

What is claimed is:

1. An electromechanical oscillator comprising; a balance wheel having an axle and an upper and a lower disc fixed in axially spaced parallel relation thereon, said wheel also having an angular oscillation arc, said upper and lower discs being magnetic and having coaxial sector portions removed therefrom, an arcuately shaped permanent magnet mounted on the underside of said upper disc, an arcuately shaped permanent magnet mounted on the upper side of said lower disc, said magnets having their ends positioned at opposite sides of said sector portions, said permanent magnets being axially magnetized and having poles of opposite polarity facing each other so as to establish an axially extending field therebetween which is continuous in the circumferential direction of said balance wheel from one side of said sector portions around the wheel to the other side of the said portions, both of said magnets having a span at least equal in length to the oscillation arc of said balance wheel and being coaxial with the said axle, magnetic shunt means on said balance wheel near said axle extending axially between said upper and lower discs to increase the strength of said field, an exciter and a driving coil coaxial therewith mounted in the axial space between said permanent magnets and within the radial range of said field, and electric circuit means interconnecting said exciter and driving coils and adapted to send a driving current impulse through said driving coil to supply a magnetic driving impulse to said balance wheel in response to a voltage induced in said exciter coil by the sudden change in said field when said sector portions pass within the range of said exciter coil.

2. An electromechanical oscillator comprising; a balance wheel having an axle and an upper and lower disc fixed in axially spaced parallel relation thereon, said wheel having an angular oscillation arc, said upper and lower discs having coaxial sector portions removed therefrom and having inner sides facing each other, an arcuately shaped permanent magnet mounted on the inner side of said upper disc coaxially with said axle and having the ends thereof at the opposite sides of the said sector portion, an arcuately shaped permanent magnet mounted on the inner side of said lower disc coaxially with said axle and having the ends thereof at the opposite sides of the said sector portion, said magnets being axially magnetized and having poles of opposite polarity facing each other and at least equal in circumferential length to the length of the oscillation arc of said balance wheel, said magnets establishing an axial field therebetween which is continuous circumferentially from one side of said sector portions around the wheel to the other side of the portions, magnetic shunt means near said axle extending between said upper and lower discs to reinforce the magnetic effect of said upper and lower magnets, coaxial exciter and driving coils mounted in the space between the planes formed by said discs and said magnets and within the radial range of said field, and electric circuit means interconnecting said exciter and driving coils and adapted to send a driving current impulse through said driving coil to develop a driving magnetic impulse on said balance wheel in response to a voltage induced in said exciter coil by the sudden change in said field when said sector portions pass within the range of said exciter coil, said circuit means comprising a transistor and a voltage source, the change of flux of the magnetic field of said magnets being strong enough to induce a current in said exciter coil sufficient to open said transistor, said transistor having a very small amplification factor.

3. The arrangement as claimed in claim 2 in which said driving coil and said voltage source are in series in the collector-emitter circuit of said transistor and said exciter coil is connected in the base-emitter circuit of said transistor.

4. The arrangement as claimed in claim 2 in which said balance wheel is adapted to occupy a null position in which the sector portions of said discs are in axial alignment with said exciter and driving coils.

5. The circuit arrangement as claimed in claim 4 in which said exciter and driving coils are concentrically mounted with one inside the other.

6. The circuit arrangement as claimed in claim 4 in which said exciter and driving coils are in axially spaced parallel relationship to each other.

References Cited by the Examiner

UNITED STATES PATENTS

| | | | |
|---|---|---|---|
| 2,843,742 | 7/1958 | Cluwen | 310—39 X |
| 2,974,265 | 3/1961 | Thoma | 318—132 |
| 2,986,683 | 5/1961 | Lavet et al. | 310—36 X |
| 3,156,857 | 11/1964 | Herr et al. | 318—132 |

MILTON O. HIRSHFIELD, *Primary Examiner.*

D. F. DUGGAN, *Assistant Examiner.*